Dec. 24, 1935.  F. W. STILWELL  2,025,622
SPRING SUSPENSION FOR VEHICLES
Filed July 16, 1934   3 Sheets-Sheet 3
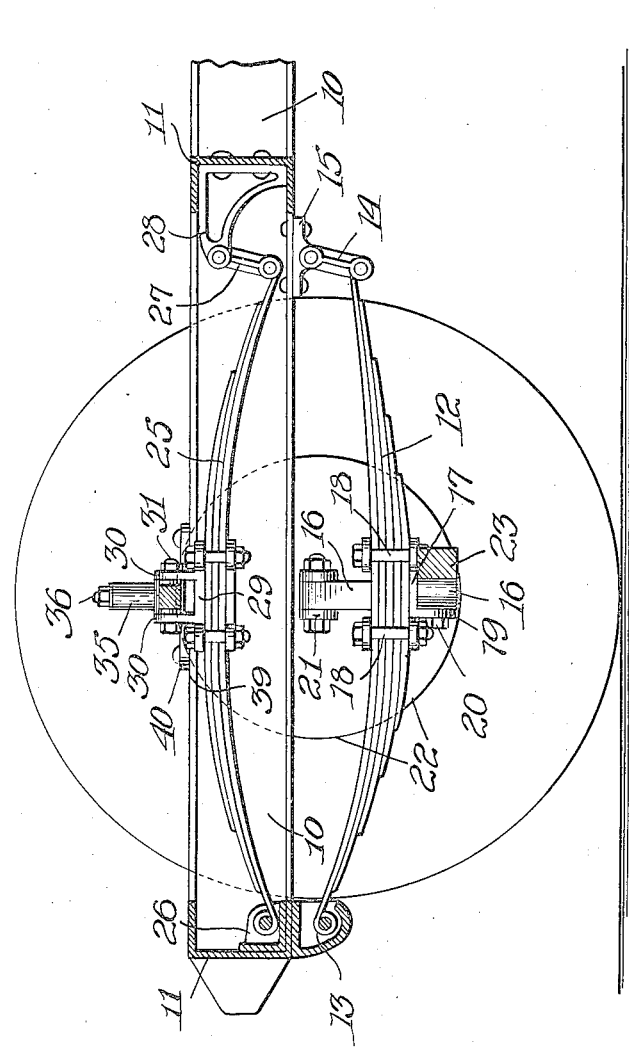
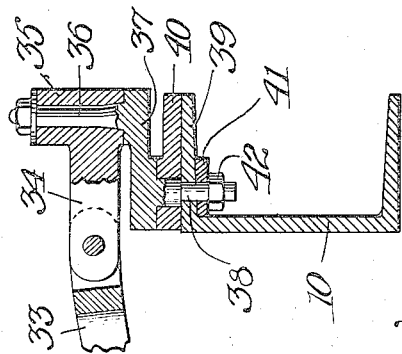
Inventor:
Fred W. Stilwell,
By Dyrenforth, Lee, Chritton and Wiles,
Attys.

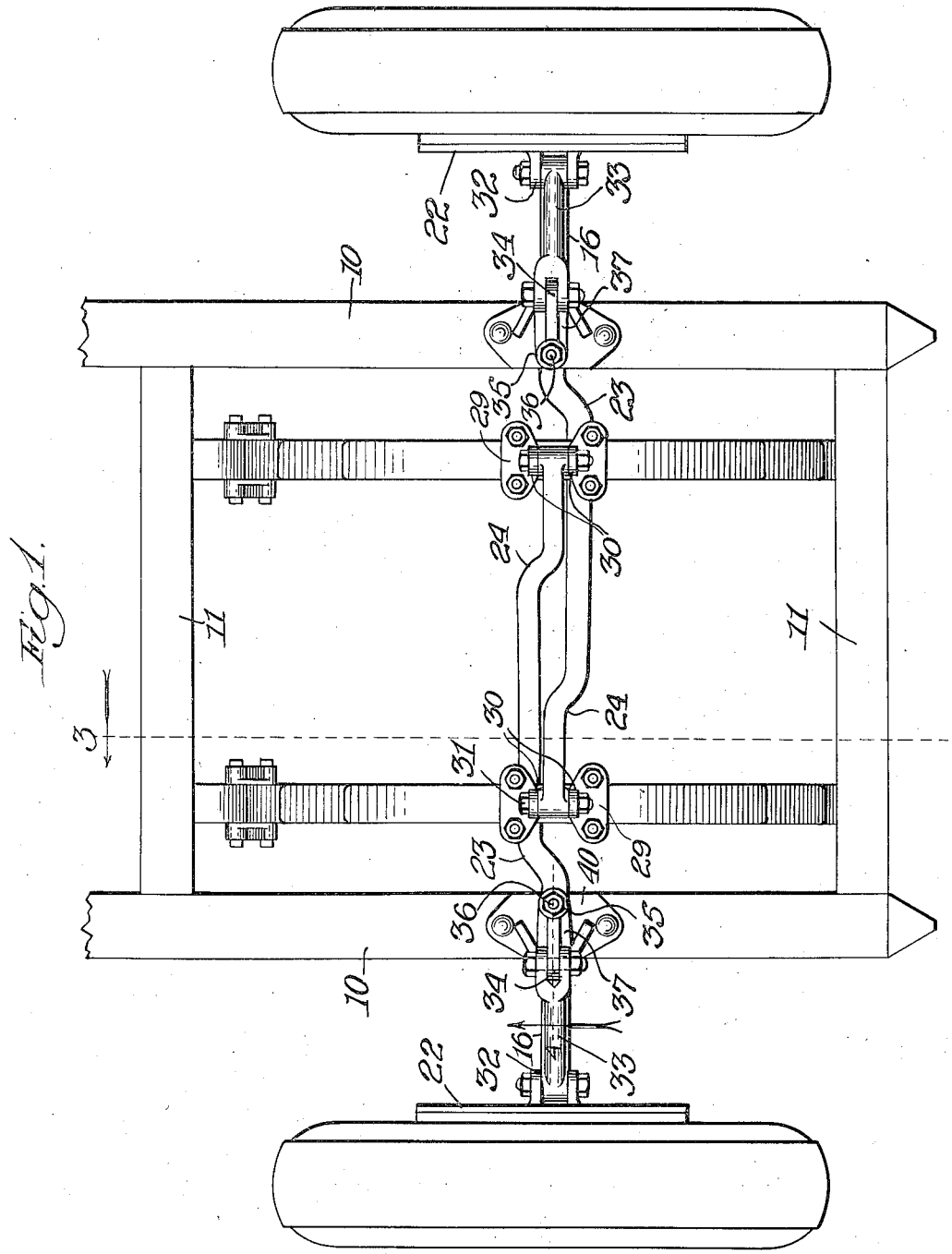

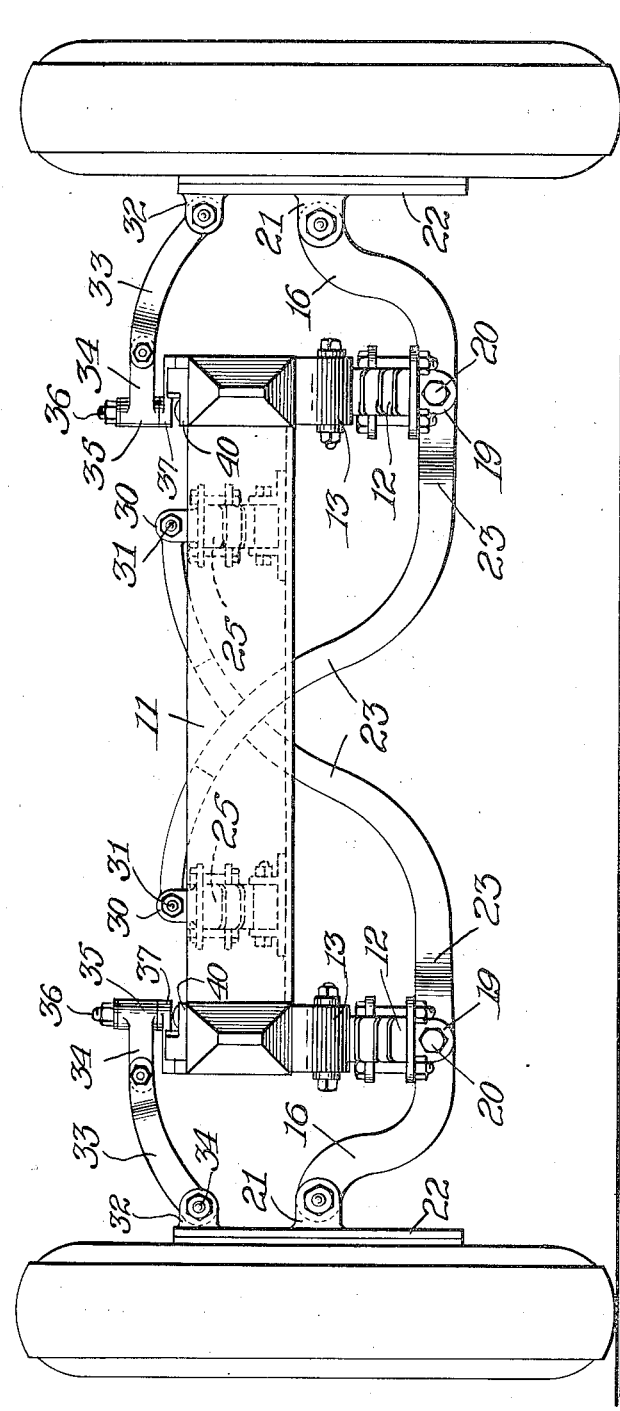

Patented Dec. 24, 1935

2,025,622

UNITED STATES PATENT OFFICE 2,025,622

SPRING SUSPENSION FOR VEHICLES

Fred W. Stilwell, Chicago, Ill.

Application July 16, 1934, Serial No. 735,494

9 Claims. (Cl. 267—19)

This invention relates to spring wheel mountings and is particularly useful in connection with spring mountings for the axles employed for the front wheels of an automobile or the like.

An object of the invention is to provide spring mountings for wheels or axles whereby each wheel may rise and fall with the spring support independently of the other wheels while, at the same time, causing relatively a very slight rise and fall of the chassis or body of the car. A further object is to provide a simple spring mounting for the axle by which the axle is kept in substantially the same angular relation to the chassis during the flexing of the spring mounting, and by which springs of substantial strength and rigidity may be employed without decreasing the resultant total degree of flexiblity for wheel or axle movement. Other specific objects and advantages will appear as the specification proceeds.

The invention is illustrated, in a preferred embodiment, by the accompanying drawings in which—

Figure 1 is a broken plan view of the front part of an automobile chassis equipped with spring mountings in accordance with my invention; Fig. 2, a front view in elevation; Fig. 3, a broken sectional view, the section being taken as indicated at line 3 of Fig. 1; and Fig. 4, a broken enlarged sectional view, the section being taken as indicated at line 4 of Fig. 1.

In the illustration given, 10 designates the forward portions of the longitudinal beams of the chassis. The beams 10 are connected by U-cross beams 11 positioned as shown more clearly in Figs. 1 and 3. Below each of the beams 10 near its forward end is secured a main wheel spring 12 which is pivotally connected at its forward end to a bracket 13 and pivotally connected at its rear end to the swinging link member 14. The link 14 is pivotally connected to bracket 15.

A rocking axle 16 is pivotally connected to each of the springs 12. As shown more clearly in Fig. 3, a plate 17 is clamped to the bottom portion of spring 12 by means of bolts 18. The plate 17 is provided with integral depending forks 19 between which the axle 16 extends. A bolt 20 pivotally secures the axle 16 within the forks of plate 17. The outer portion of each axle is curved upwardly and pivotally secured to the lug 21 centrally disposed within plate 22. The plate 22 and the drum of the wheel, together with its pivotal support and steering connections, being of well known construction, will not be described herein. Each axle 16 extends inwardly of the spring 12 and is curved laterally at 23 to provide an offset and at 24 the curve is reversed, as shown more clearly in Fig. 1. At the same time, the inner portion of each axle 16 is curved upwardly as shown more clearly in Fig. 2. Extending longitudinally between the cross beams 11 are auxiliary springs 25. As shown more clearly in Fig. 3, the springs 25 are pivotally connected to a boss 26 at the forward cross beam 11 and connected at their rear end to the swinging link 27 pivotally carried by bracket 28 which is secured to the rear cross beam 11. It will be noted that the springs 12 and 25 are similarly positioned with respect to their fixed pivotal points and at their swinging ends. Clamped to the central portion of each of the auxiliary springs 25 is a plate 29 equipped with upwardly extending flanges 30. Between the flanges extends the end of one of the axles 16 and a bolt 31 pivotally secures the inner free end of the axle to flanges 30.

If desired, means may be provided for bracing the upper portion of the plates 22. As shown more clearly in Figs. 1, 2 and 4, the plate 22 at its upper end is equipped with a boss 32 providing spaced flanges between which extends the end of a brace arm 33. A bolt 34 pivotally connects the end of arm 33 to the flanges of lug 32. At its upper end, the arm 33 is pivotally connected to a short arm 34 having a sleeve 35 pivotally receiving the pin 36. The pin 36 is carried by the crank 37 which is provided at its inner end with a bolt portion 38 extending through the upper flange 39 of the chassis beam 10. Preferably, the flange 39 is provided with a plate 40 thereabove and with a spacer plate 41 therebelow. A nut 42 engages the lower threaded end of bolt 38 and secures it against the spacer plate 41.

Operation

In the operation of the mechanism, when the wheel on one of the axles 16 strikes a raised point in the road, the upwardly directed force against the outer end of the axle 16 exerts pressure upwardly against spring 12 and at the same time, the inner end of the axle exerts downward force upon its auxiliary spring 25. Both springs yield as the axle rocks about its pivotal connection with spring 12. The springs 12 and 25 may be of such strength as to allow a greater yielding on the part of one spring and less yielding on the part of the other spring or, if desired, the yielding may be substantially equal. I prefer to have a slightly greater yielding of the auxiliary spring 25. This permits the wheel to rise a substantial distance without causing much compression of spring 12 and thereby lifting the chassis a relatively slight amount. The offset portion of the two axles 16 permits the two wheels to rise and fall independently and the space between the axles permits the axles to be displaced slightly with respect to each other and longitudinally of the chassis.

By reason of the mounting of the springs, as shown in Fig. 3, as the springs 12 and 25 are flexed and thereby lengthened, the axle tends to move at both ends with the springs slightly toward the rear of the car and always at substantially right angles to the chassis frame. The bracing arm 33 by reason of its connection through arm 34 with the crank 37 permits the wheels to be moved by the springs forwardly and rearwardly in a course parallel with the beams 10 of the chassis.

Considerable variation can be made in the relative rigidity or strength of the springs 12 and 25. If the spring 25 is made considerably weaker than spring 12, after making allowance for the greater length of the axle portion lying between the two springs over that portion lying between spring 12 and the wheel, the axle will tend to flex, when the wheel strikes an irregular rise in the road, the auxiliary spring 25 without flexing to any appreciable degree spring 12. This tends to reduce the effect upon the frame of the car of slight irregularities in the road. On the other hand, certain advantages may be obtained by causing a greater flexing of spring 12 over auxiliary spring 25 or by substantially dividing the degree of flexing between the springs. Whatever the degree of flexing of the auxiliary spring 25, it enables the wheel to rise a certain distance without requiring a corresponding flexing of spring 12. In other words, the flexing of springs 12 and 25 are additive in their effect upon the vertical movement of the wheel.

While in the illustration given, I have set forth certain forms of springs and certain connections with the chassis, it will be understood that other springs may be substituted by anyone skilled in the art to obtain the same results and without departing from the spirit of my invention. Considerable modification can be made in the parts and details thereof as shown in the drawings and described in this specification while still utilizing my invention.

The foregoing detailed description has been given for clearness of understanding only, and no unnecessary limitations should be understood therefrom, but the appended claims should be construed as broadly as permissible, in view of the prior art.

I claim:

1. In combination with a vehicle frame, a spring secured thereto, a rocking axle pivotally secured to said spring and at substantially right angles thereto and equipped at its outer end with a wheel, and an inner spring secured to said frame and to the inner free end of said axle.

2. In combination with a vehicle frame, a spring secured to the bottom side thereof, an axle pivotally secured to the bottom side of said spring and at substantially right angles thereto and equipped at its outer end with a wheel, and a compression spring having its top portion secured to the inner free end of said axle.

3. In combination with a vehicle frame, a pair of springs secured to the under side thereof, a pair of axles pivotally secured to said springs and equipped at their outer ends with wheels, and a pair of inner springs secured to said frame and to the inner free ends of each axle.

4. In combination with a vehicle frame, a pair of springs secured to the under side thereof, a pair of axles pivotally secured to said springs and equipped at their outer ends with wheels, and a pair of inner springs secured to said frame and to the inner free ends of each axle, said axles being offset to permit vertical independent movement thereof.

5. A four-wheeled vehicle characterized in that the two forward wheels are mounted on independent axles, each axle being pivotally secured to a spring and at substantially right angles thereto below said vehicle and having its inner free end secured to an auxiliary spring.

6. In combination with a vehicle frame equipped with springs therebelow, axles pivotally secured to said springs to permit rocking movement of the axles transversely of said frame, wheels secured to the outer ends of said axles, auxiliary springs secured to said frame and to the inner ends of said axles, and pivotally secured bracing members between said frame and said wheels permitting vertical movement of said wheels.

7. In combination with a vehicle frame, a pair of leaf springs secured to the forward portion of said vehicle, one end of each spring being pivotally fixed to the frame and the other being connected to the frame by a swinging link, axles pivotally connected to said springs and equipped at their outer ends with wheels, auxiliary springs similar to said first mentioned springs and having their fixed and swinging link connections transversely aligned with the similar connections of said first-mentioned springs, and means pivotally connecting the inner end of each axle to one of said auxiliary springs.

8. In combination with a vehicle frame, a pair of leaf springs secured to the forward portion of said vehicle, one end of each spring being pivotally fixed to the frame and the other being connected to the frame by a swinging link, axles pivotally connected to said springs and equipped at their outer ends with wheels, auxiliary springs similar to said first-mentioned springs and having their fixed and swinging link connections transversely aligned with the similar connections of said first-mentioned springs, means pivotally connecting the inner end of each axle to one of said auxiliary springs, a crank pivotally connected to each side of said frame, and a brace arm pivotally connected to each wheel and to said crank whereby said wheel may move vertically and longitudinally of the frame.

9. In combination with a vehicle frame, a pair of springs secured to the forward portion thereof, axles pivotally secured to said springs and provided at their outer ends with wheels, auxiliary springs secured to said frame and also to the inner ends of said axles, said first-mentioned springs and said auxiliary springs permitting longitudinal movement of said axles with respect to said frame and bracing means securing each of said wheels to said frame and permitting longitudinal and vertical movement thereof.

FRED W. STILWELL.